(No Model.)

J. O. BOGGS.
MEASURING VESSEL.

No. 377,369. Patented Feb. 7, 1888.

Witnesses
T. W. Fowler
W. H. Patterson

Inventor
Joseph O. Boggs;
By his Attorneys
A. H. Evans & Co.

UNITED STATES PATENT OFFICE.

JOSEPH O. BOGGS, OF HARRISBURG, PENNSYLVANIA, ASSIGNOR OF ONE-FOURTH TO WILLIAM A. MIDDLETON AND WILSON T. CORNMAN, BOTH OF SAME PLACE.

MEASURING-VESSEL.

SPECIFICATION forming part of Letters Patent No. 377,369, dated February 7, 1888.

Application filed May 7, 1887. Serial No. 237,414. (No model.)

*To all whom it may concern:*

Be it known that I, JOSEPH O. BOGGS, a citizen of the United States, residing at Harrisburg, in the county of Dauphin and State of Pennsylvania, have invented certain new and useful Improvements in Measuring-Vessels, of which the following is a full, clear, and exact description, reference being had to the accompanying drawings, forming part of this specification, in which—

Figure 1:
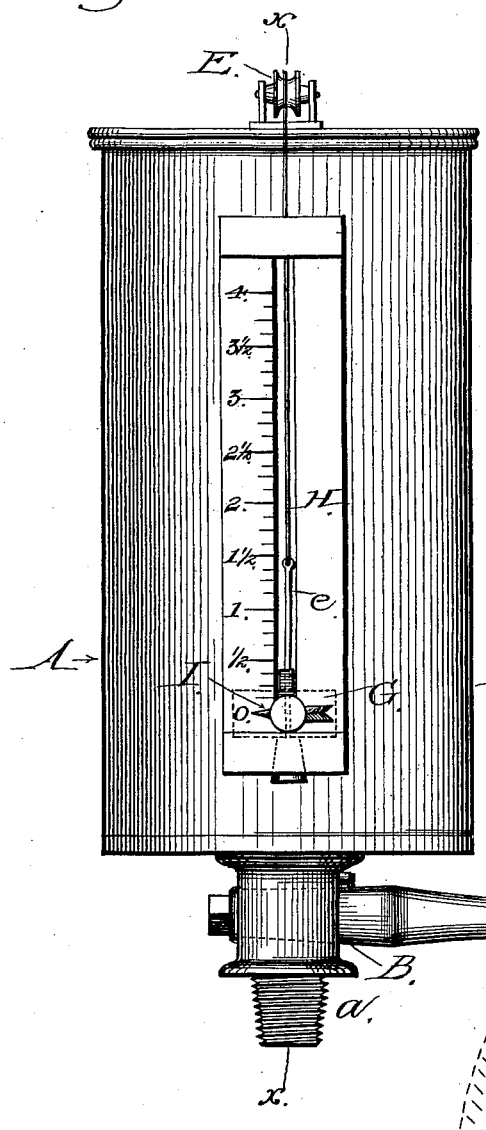
Figure 2:
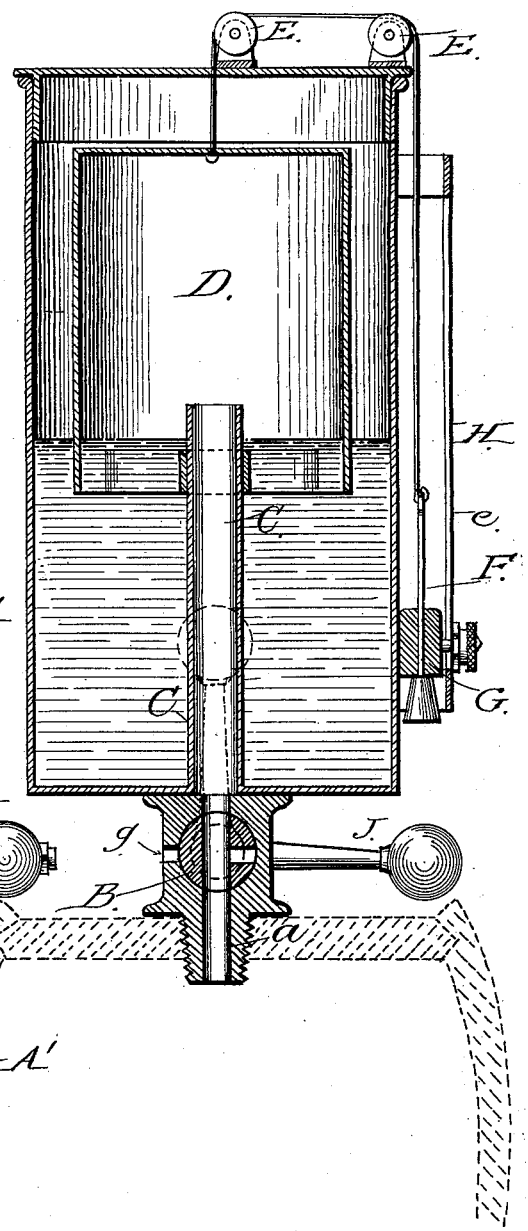

Figure 1 represents a front elevation of a measuring-vessel embodying my invention. Fig. 2 is a sectional view of the same on the line X X of Fig. 1.

My invention relates to vessels for measuring liquids; and it consists, essentially, in a vessel or chamber containing air and connected with the liquid-containing barrel or vessel, so that when the contents of the latter are being drawn off in predetermined quantities a like amount or quantity of air is drawn from the air-chamber into the liquid-containing barrel or vessel to take the place of the displaced liquid.

My invention also consists in connecting with the movable dome of an air vessel or chamber an indicating device for determining the amount of air displaced in said vessel and the consequent amount of liquid drawn from the barrel.

My invention further consists in the peculiar construction and combination of devices, which I shall hereinafter fully describe and claim.

To enable others skilled in the art to make and use my invention, I will describe its construction and indicate the manner in which the same is carried out.

In the said drawings, A represents an exterior vessel having a coupling, a, by means of which said vessel and its connections may be attached to a liquid-containing barrel or cask, the said coupling being adapted to be screwed into the bung-hole or any part of the top of the barrel or cask A'. The said coupling is provided with a suitable valve, B, by means of which communication between the air and liquid-containing vessels may be opened and closed. A pipe or tube, C, extends upwardly from the center of the vessel A, and is in direct communication with the usual opening through the coupling, as shown in Fig. 2, and a dome or inverted vessel, D, is suitably suspended over and guided by the tube, the said vessel having at its lower open end a sleeve through which said tube passes. In the lower portion of the exterior is placed oil, water, or other liquid, into which the lower end of the inverted vessel dips, whereby a tight joint or seal is formed to prevent the admission or escape of air between said tube or vessel.

To the top of the vessel D one end of a cable or cord is attached, said cable passing over guide-pulleys E on top of the exterior vessel, A, and being connected at its other end to a rod, F, on which is mounted a weight, G, the said weight and rod being guided in their movements by a plate, H, the other face of which is provided with graduations or marks indicating the capacity of the measure. A pointer or index, I, on the weight extends through a slot, e, in the plate H, and in conjunction with the graduations before mentioned indicates the amount of air drawn from the measure and the consequent quantity of liquid drawn from the barrel or cask to which said measure is attached.

The operation of my measure is substantially as follows: It is well-known that a given amount of liquid drawn from a barrel or vessel requires a like amount of air to replace it or to fill the vacuum created by drawing off the liquid. To accomplish this feature I fill the exterior vessel up to a point three-fourths of an inch from the top of the tube or pipe C with oil, water, or other liquid, and permit the inverted vessel to rest upon said body of liquid with its lower edge dipping into the same. The pointer or index is now adjusted, by loosening the screw which holds it in place on the movable weight, to the zero-point on the contiguous scale. The measure having been properly secured to the barrel or cask and communication between said measure and barrel being established, it is evident that if a given amount of liquid be drawn from said barrel a like amount of air must be drawn from the air chamber or dome D to fill the vacuum thus created. Therefore as the liquid is being drawn from the barrel the inverted vessel or dome begins to sink, drawing upon the pointer upon the outside of the vessel A and indicating the exact amount of liquid drawn from the barrel. By moving the valve-operating lever J into a vertical position communication is cut off between the measure and barrel, and the pointer may be drawn back to the zero-point without difficulty, and as the dome D rises outside air rushes in through a small port, $g$, and charges said dome, so that it may again operate to indicate the amount of liquid taken from the barrel, it being understood that the port $g$ is closed by the valve B when direct communication is established between the measure and barrel.

The device herein described is capable of varied changes and modifications. I therefore do not wish to be understood as confining myself to any particular form or capacity of measure or to the manner of connecting the same to the liquid-containing vessel, as these may be changed to meet existing circumstances.

Having thus described my invention, what I claim as new, and desire to secure by Letters Patent, is—

1. A vessel or measure containing air under pressure and an indicating device connected therewith, in combination with a liquid-containing vessel communicating with the interior of said measure, substantially as described.

2. The combination, with a liquid-containing vessel, of an air-vessel communicating therewith and an indicating apparatus on said air-vessel, whereby a given amount of liquid displaced causes a like amount of displaced air to be indicated, substantially as described.

3. The method of indicating the amount of liquid drawn from a vessel, consisting in connecting said vessel with an air chamber or vessel, which supplies the liquid-containing vessel with air in quantities corresponding with the liquid removed, and in attaching to said air-vessel a device for indicating the amount of displaced air, substantially as herein described.

4. The combination, with a liquid-containing vessel, of an air-measure comprising an exterior vessel having an air tube or pipe, an internal vertically-moving dome or chamber containing air and communicating with said tube or pipe, and an exterior indicating device operated by the dome or chamber to register both the amount of air removed from said dome or chamber and the amount of liquid drawn from the vessel, substantially as described.

5. An air-measure having an indicating apparatus, in combination with a liquid-containing barrel or vessel communicating with and drawing air therefrom in amounts corresponding to the amounts of liquid withdrawn, substantially as herein described.

JOSEPH O. BOGGS.

Witnesses:
S. W. FLEMING,
A. J. YARLIN.